(12) United States Patent
Wu

(10) Patent No.: US 11,184,788 B2
(45) Date of Patent: Nov. 23, 2021

(54) DEVICE AND METHOD OF HANDLING A MEASUREMENT GAP IN A WIRELESS COMMUNICATION SYSTEM

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/949,080

(22) Filed: Apr. 10, 2018

(65) Prior Publication Data

US 2018/0302818 A1 Oct. 18, 2018

Related U.S. Application Data

(60) Provisional application No. 62/484,878, filed on Apr. 12, 2017.

(51) Int. Cl.
| | | |
|---|---|---|
| *H04W 24/10* | (2009.01) |
| *H04W 24/08* | (2009.01) |
| *H04W 76/10* | (2018.01) |
| *H04W 36/00* | (2009.01) |

(52) U.S. Cl.
CPC ........... *H04W 24/10* (2013.01); *H04W 24/08* (2013.01); *H04W 76/10* (2018.02); *H04W 36/0083* (2013.01)

(58) Field of Classification Search
CPC ..... H04W 24/10; H04W 76/10; H04W 24/08; H04W 36/0083
See application file for complete search history.

(56) References Cited

U.S. PATENT DOCUMENTS

| | | | |
|---|---|---|---|
| 9,167,462 B2 | 10/2015 | Kazmi | |
| 2015/0327322 A1 | 11/2015 | Huang | |
| 2016/0073442 A1* | 3/2016 | Koskinen | H04W 76/15 370/329 |
| 2017/0048108 A1 | 2/2017 | Yi | |
| 2018/0324624 A1* | 11/2018 | Gu | H04W 24/10 |

(Continued)

FOREIGN PATENT DOCUMENTS

| | | |
|---|---|---|
| CN | 1112345 A | 11/1995 |
| CN | 201248141 Y | 5/2009 |
| WO | 2016/182527 A1 | 11/2016 |

OTHER PUBLICATIONS

3GPP TS 36.331 V14.1.0, Dec. 2016.

(Continued)

*Primary Examiner* — Luat Phung
(74) *Attorney, Agent, or Firm* — Winston Hsu

(57) ABSTRACT

A communication device of handling a measurement gap comprises a storage device and a processing circuit, coupled to the storage device. The storage device stores, and the processing circuit is configured to execute instructions of: connecting to a master base station (MBS); connecting to a secondary base station (SBS), while connecting to the MBS; receiving a first measurement gap configuration configuring a first plurality of measurement gaps for the communication device, from the SBS; determining a first plurality of locations of the first plurality of measurement gaps according to a first system time acquired from the SBS; and performing at least one first measurement on a first carrier in the first plurality of measurement gaps according to the first plurality of locations.

13 Claims, 6 Drawing Sheets

(56) References Cited

U.S. PATENT DOCUMENTS

| | | | |
|---|---|---|---|
| 2018/0324682 A1* | 11/2018 | da Silva | H04W 48/16 |
| 2019/0182782 A1* | 6/2019 | Wang | H04W 56/0015 |
| 2020/0162222 A1* | 5/2020 | Liu | H04W 72/042 |
| 2020/0163037 A1* | 5/2020 | Zheng | H04L 5/0078 |
| 2020/0178194 A1* | 6/2020 | Li | H04W 24/10 |

OTHER PUBLICATIONS

3GPP TR 38.804 V1.0.0, Mar. 2017.
Search Report dated Sep. 7, 2018 for EP application No. 18166840.1, pp. 1-6.
Intel Corporation, "Discussion on SFN timing difference in Dual connectivity", 3GPP TSG-RAN WG4 Meeting #71, R4-143028, May 19-23, 2014, Seoul, Korea, XP050797797, pp. 1-7.
Office action dated Nov. 23, 2020 for the China application No. 201810325786.2, filing date Apr. 12, 2018, pp. 1-7.
Notice of allowance dated Jul. 20, 2021 for the China application No. 201810325786.2, filing date Apr. 12, 2018, pp. 1-4.
3GPP TS 37.340 V15.6.0 (Jun. 2019), "3rd Generation Partnership Project; Technical Specification Group Radio Access Network; Evolved Universal Terrestrial Radio Access (E-UTRA) and NR; Multi-connectivity; Stage 2 (Release 15)", pp. 1-69, Jun. 2019.

* cited by examiner

DEVICE AND METHOD OF HANDLING A MEASUREMENT GAP IN A WIRELESS COMMUNICATION SYSTEM

CROSS REFERENCE TO RELATED APPLICATIONS

This application claims the benefits of U.S. Provisional Applications No. 62/484,878, filed on Apr. 12, 2017, which is incorporated herein by reference.

BACKGROUND OF THE INVENTION

1. Field of the Invention

The present invention relates to a communication device and a method used in a wireless communication system, and more particularly, to a communication device and method of handling a measurement gap in a wireless communication system.

2. Description of the Prior Art

A user equipment (UE) may communicate with a network including a master node and a secondary node in dual connectivity (DC). However, it is unknown how to handle a measurement gap in the DC. Thus, how to handle the measurement gap in the DC is an important problem to be solved.

SUMMARY OF THE INVENTION

The present invention therefore provides a communication device and method for handling a measurement gap to solve the abovementioned problem.

A communication device of handling a measurement gap comprises a storage device and a processing circuit, coupled to the storage device. The storage device stores, and the processing circuit is configured to execute instructions of: connecting to a master base station (MBS); connecting to a secondary base station (SBS), while connecting to the MBS; receiving a first measurement gap configuration configuring a first plurality of measurement gaps for the communication device, from the SBS; determining a first plurality of locations of the first plurality of measurement gaps according to a first system time acquired from the SBS; and performing at least one first measurement on a first carrier in the first plurality of measurement gaps according to the first plurality of locations.

A network of handling a measurement gap, configured to execute instructions of: a master base station (MBS) of the network connecting to a communication device; a secondary base station (SBS) of the network connecting to the communication device, while the MBS connecting to the communication device; and the SBS transmitting a first measurement gap configuration configuring a first plurality of measurement gaps to the communication device, wherein the SBS determines a first plurality of locations of the first plurality of measurement gaps according to a first system time of the SBS.

A network of handling a measurement gap, configured to execute instructions of: a master base station (MBS) of the network connecting to a communication device; a secondary base station (SBS) of the network connecting to the communication device, while the MBS connecting to the communication device; the SBS receiving a second measurement gap configuration configuring a second plurality of measurement gaps to the communication device, from the MBS; the SBS determining a first plurality of locations of a first plurality of measurement gaps according to the second measurement gap configuration; and the SBS transmitting a first measurement gap configuration configuring the first plurality of measurement gaps to the communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
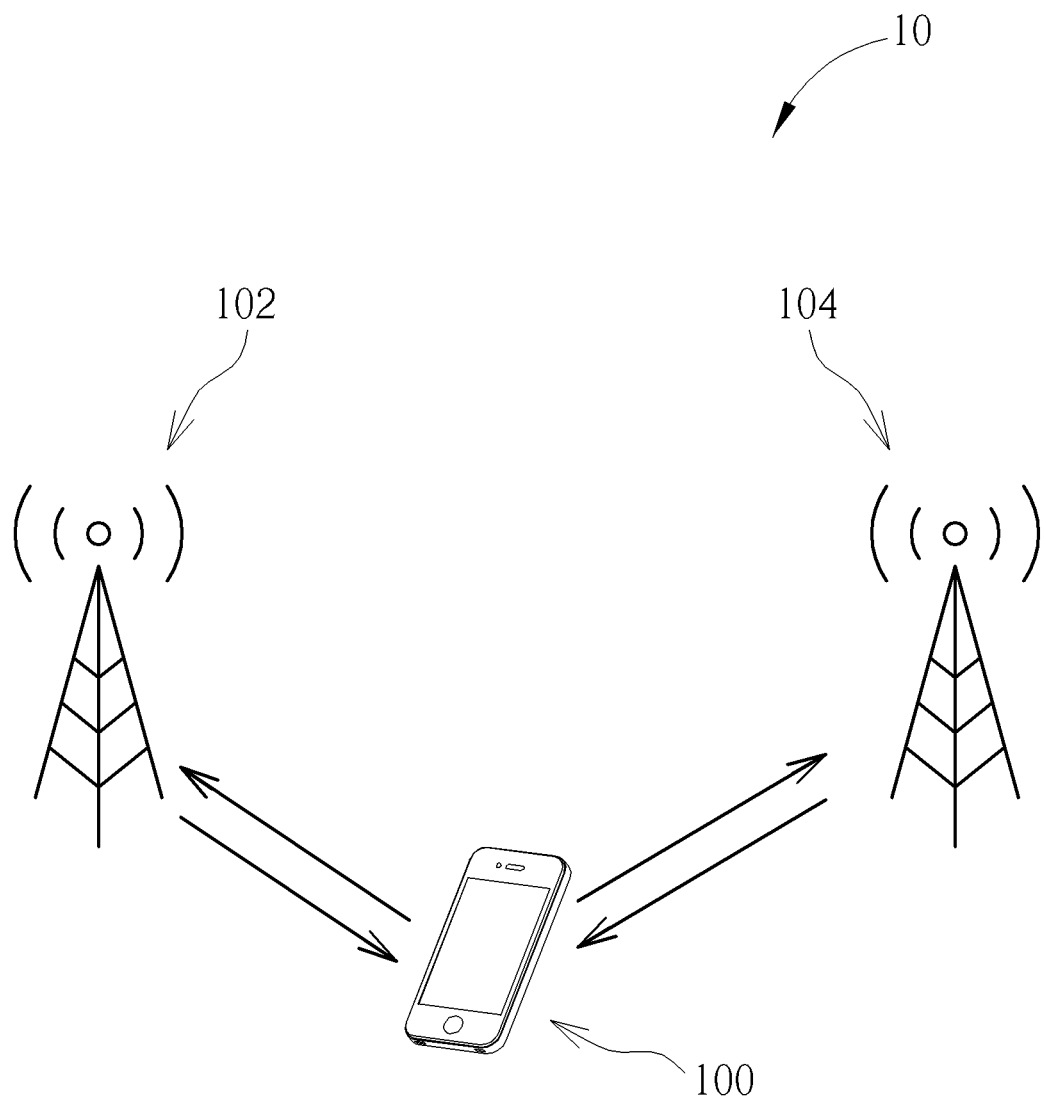
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100, base station (BSs) 102 and 104. In FIG. 1, the communication device 100, the BS 102s and 104 are simply utilized for illustrating the structure of the wireless communication system 10. Practically, each of the BSs 102 and 104 may be an evolved Node-B (eNB), an enhanced eNB, or a fifth generation (5G) (or called new radio (NR)) BS (or called gNB) and may connect to an evolved packet core (EPC) or a 5G core (5GC). The 5G radio communication technology may employ orthogonal frequency-division multiplexing (OFDM) and/or non-OFDM, and transmission time interval (TTI) shorter than 1 ms (e.g., 1, 2, 3 or 4 OFDM symbols, 100, or 200 us) for communicating between the communication devices and the 5G BS.

As shown in FIG. 1, the communication device 100 may be configured to communicate with the BSs 102 and 104 simultaneously according to dual connectivity. That is, the communication device 100 may perform a transmission/reception via both the BSs 102 and 104. For example, the communication device 100 may transmit and/or receive packets (e.g., protocol data units (PDUs)) to and/or from the BS 102 via at least one cell of the BS 102, while the communication device 100 may transmit and/or receive packets (e.g., PDUs) to and/or from the BS 104 via at least one cell of the BS 104. In addition, one of the BSs 102 and 104 may be a master BS (MBS) and the other BS may be a secondary BS (SBS).

Technical terms related to the examples in the present invention are explained as follows to simplify description of successive examples. A communication device in RRC CONNECTED may be configured with a master cell group (MCG) for communicating with a MBS and a secondary cell group (SCG) for communicating with a SBS, i.e., in dual connectivity (DC) with the MBS and the SBS. The MBS may be a master eNB (MeNB) or a master gNB (MgNB). The SBS may be a secondary eNB (SeNB) or a secondary gNB (SgNB). The MCG may include a primary cell (Pcell) and secondary cell(s) (SCell(s)) of the MBS, if the SCell(s) is configured to the communication device. The SCG may include a primary SCell (PSCell) and the SCell(s) of the SBS if the SCell (s) is configured to the communication device. A MCG bearer may be a radio bearer whose radio protocols are only located in a MBS to use MBS resources only. A SCG bearer may be a radio bearer whose radio protocols are only located in a SBS to use SBS resources. A split bearer may be a bearer whose radio protocols are located in both the MBS and the SBS to use both MBS and SBS resources.

A communication device may be a user equipment (UE), a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for a UL, the communication device is the transmitter and the network is the receiver, and for a DL, the network is the transmitter and the communication device is the receiver.

Figure 2:
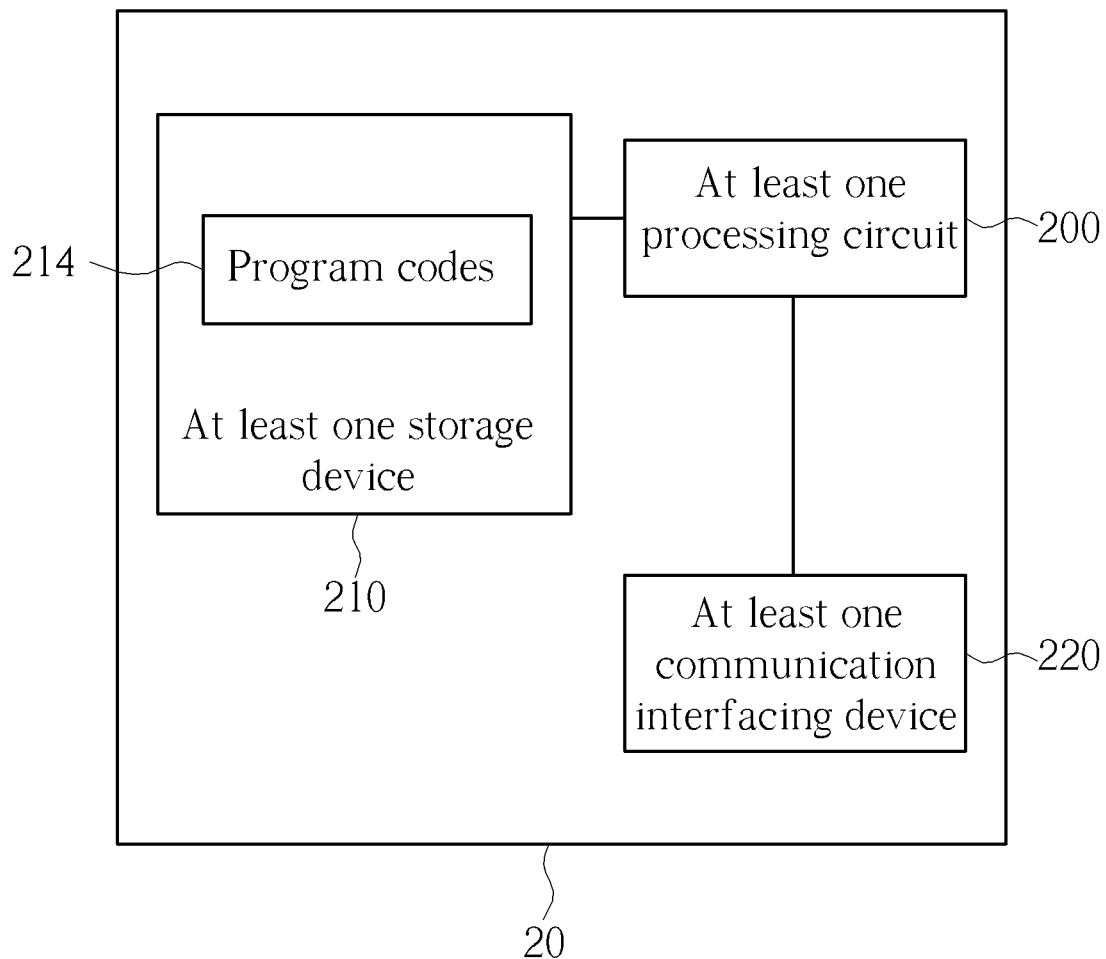
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver and is used to transmit and receive signals (e.g., data, messages and/or packets) according to processing results of the at least one processing circuit 200.

In the following examples, a UE is used to represent a communication device in FIG. 1, to simplify the illustration of the embodiments.

Figure 3:
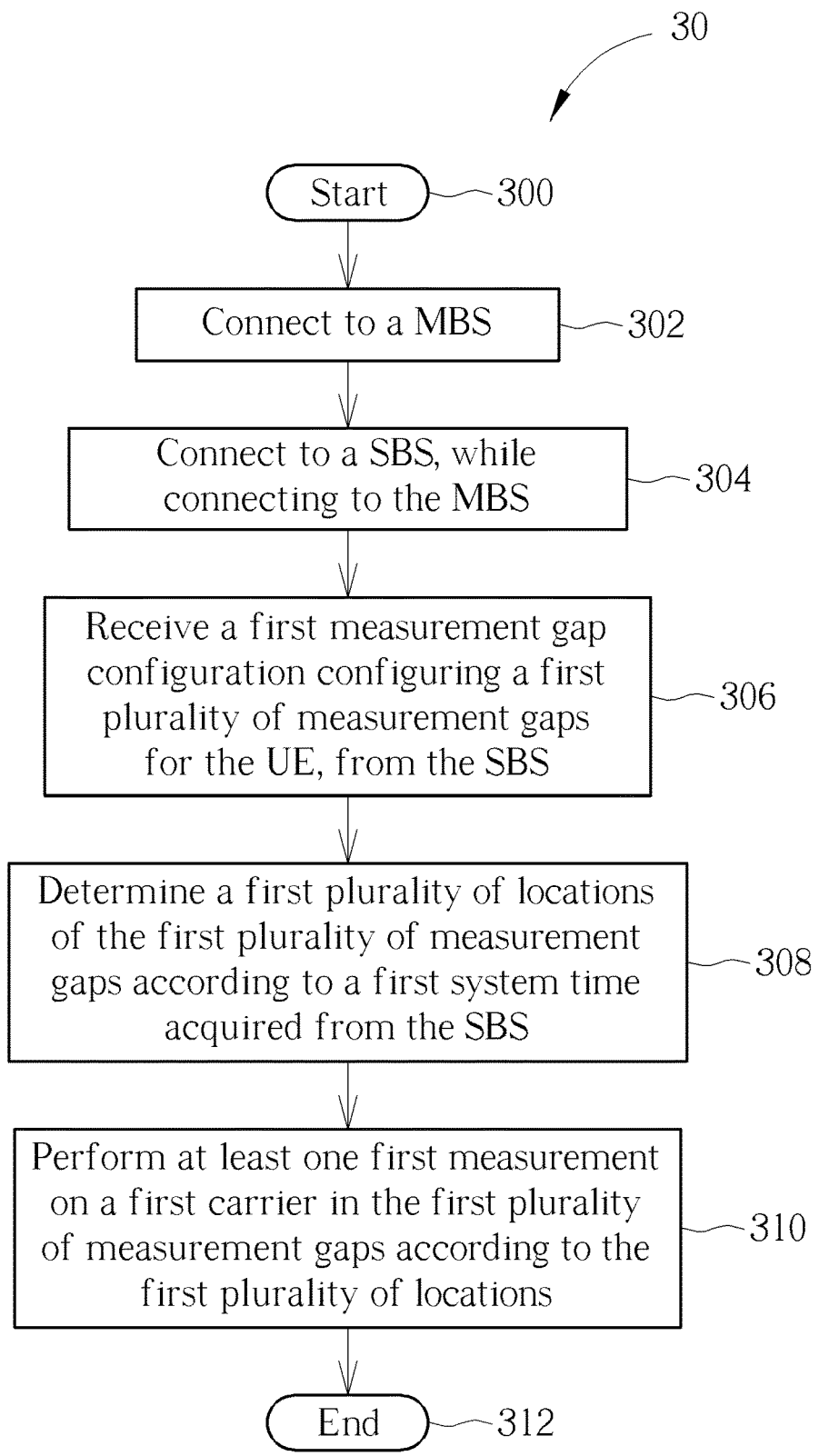
FIG. 3 is a flowchart of a process according to an example of the present invention.

A process 30 in FIG. 3 may be utilized in a UE, and includes the following steps:

Step 300: Start.
Step 302: Connect to a MBS.
Step 304: Connect to a SBS, while connecting to the MBS.
Step 306: Receive a first measurement gap configuration configuring a first plurality of measurement gaps for the UE, from the SBS.
Step 308: Determine a first plurality of locations of the first plurality of measurement gaps according to a first system time acquired from the SBS.
Step 310: Perform at least one first measurement on a first carrier in the first plurality of measurement gaps according to the first plurality of locations.
Step 312: End.

The UE connects to the SBS while connecting to the MBS. That is, the UE is in DC with the MBS and the SBS.

In one example, the UE transmits a first measurement result of the first carrier to the SBS in response to or according to the at least one first measurement, e.g., directly or via the MBS.

In one example, the UE establishes a RRC connection with the MBS, to connect to the MBS. The UE may establish a MCG bearer, a SCG bearer or a SCG split bearer with the SBS, to connect to the SBS.

In one example, the UE receives the first measurement gap configuration from the SBS via a signaling radio bearer (SRB) (e.g., directly), while connecting to the MBS. The SRB may be a SRB 3, a SCG SRB or a SCG split SRB. In one example, the UE receives the first measurement gap configuration from the SBS via a RRC connection with the MBS. That is, the first measurement gap configuration is forwarded to the UE by the MBS.

In one example, the UE receives a second measurement gap configuration configuring a second plurality of measurement gaps for the UE, from the MBS (e.g., directly) on a SRB (e.g., a SRB 1, a MCG SRB or a MCG split SRB). The UE may determine a second plurality of locations of the second plurality of measurement gaps according to a second system time acquired from the MBS. The UE may perform at least one second measurement on a second carrier in the second plurality of measurement gaps according to the second plurality of locations. The UE may transmit a second measurement result of the second carrier to the MBS (e.g., directly) in response to or according to the at least one second measurement. The first carrier and the second carrier may be the same or different.

In one example, the first or second (first/second) system time acquired on a carrier from a BS (e.g., the MBS or the SBS) comprises a system frame number (SFN), a subframe/timeslot number, a synchronization signal (SS) block number, or combination thereof. In one example, the first/second system time acquired on a carrier from a BS (e.g., the MBS or the SBS) comprises at least one of a SFN, a subframe/timeslot number and a SS block number.

In one example, the first/second system time acquired on a carrier from a BS (e.g., the MBS or the SBS) comprises a SS burst set number, a SS burst number, a SS block number, or combination thereof. In one example, the first/second system time acquired on a carrier from a BS (e.g., the MBS or the SBS) comprises at least one of a SS burst set number, a SS burst number and a SS block number. The SS burst set number may identify a SS burst set which includes a plurality of SS bursts. The SS burst set number may identify a plurality of SS blocks.

The SS block number (or called SS block index) may identify a SS block transmitted by the BS in a time instant (e.g., one or more OFDM symbols). The SS block may include at least one SS (e.g., a primary SS and/or a secondary SS) and a physical broadcast channel (PBCH).

In one example, the UE acquires the first/second system time from the BS by receiving at least one SS from the BS. In one example, the UE acquires the first/second system time by receiving a PBCH from the BS. In one example, the UE obtains the SFN, the subframe/timeslot number, the SS burst set number, the SS burst number, and/or the SS block number from the at least one SS and/or the PBCH.

In one example, the UE determines the first/second plurality of locations of the first/second plurality of measurement gaps according to an equation. The equation may utilize at least one of the SFN, the subframe/timeslot number, the SS burst set number, the SS burst number, and the SS block number, with arithmetic operation (e.g., modulo, dividing, multiplying, adding and/or subtracting). That is, the UE may determine a location of a measurement gap of the first plurality of measurement gaps, when at least one of a first SFN, a first subframe/timeslot number, a first SS burst set number, a first SS burst number, and a first SS block number meets the equation. The UE may determine a location of a measurement gap of the second plurality of measurement gaps, when at least one of a second SFN, a second subframe/timeslot number, a second SS burst set number, a second SS burst number, and a second SS block number meets the equation.

In one example, the equation may be a following equation:

$$SFN \bmod T = \left\lfloor \frac{\text{gapOffset}}{10} \right\rfloor;$$

wherein $\lfloor \cdot \rfloor$ is a floor function;
subframe=gapOffset mod 10;
wherein $$T = \frac{\text{Measurement Gap Repetition Period } (MGRP)}{10}.$$

According to the example of the equation, a subframe (e.g., the first subframe) of each of the first plurality of measurement gaps occurs at an SFN and the subframe meets the equation. According to the example of the equation, a subframe (e.g., the first subframe) of each of the second plurality of measurement gaps occurs at an SFN and the subframe meets the equation. The first measurement gap configuration may configure a first MGRP and the second measurement gap configuration may configure a second MGRP.

In one example, the MBS and the SBS use the same radio access technology (RAT) (e.g., the LTE or the NR) or different RATs. In one example, the MBS uses the LTE (e.g., E-UTRAN) and the SBS use the NR (e.g., 5G). In one example, the SBS uses the LTE (e.g., E-UTRAN) and the MBS uses the NR (e.g., 5G).

In one example, the UE receives a first measurement configuration configuring the first carrier to be measured from the SBS. The UE may perform the at least one first measurement on the first carrier (according to the first measurement configuration) in the first plurality of measurement gaps (according to the first measurement gap configuration). The UE may receive a second measurement configuration configuring the second carrier to be measured from the MBS. The UE may perform the at least one second measurement on the second carrier (according to the second measurement configuration) in the second plurality of measurement gaps (according to the second measurement gap configuration).

Examples/description for the process 30 above may be modified to a process 40 as following.

Figure 4:
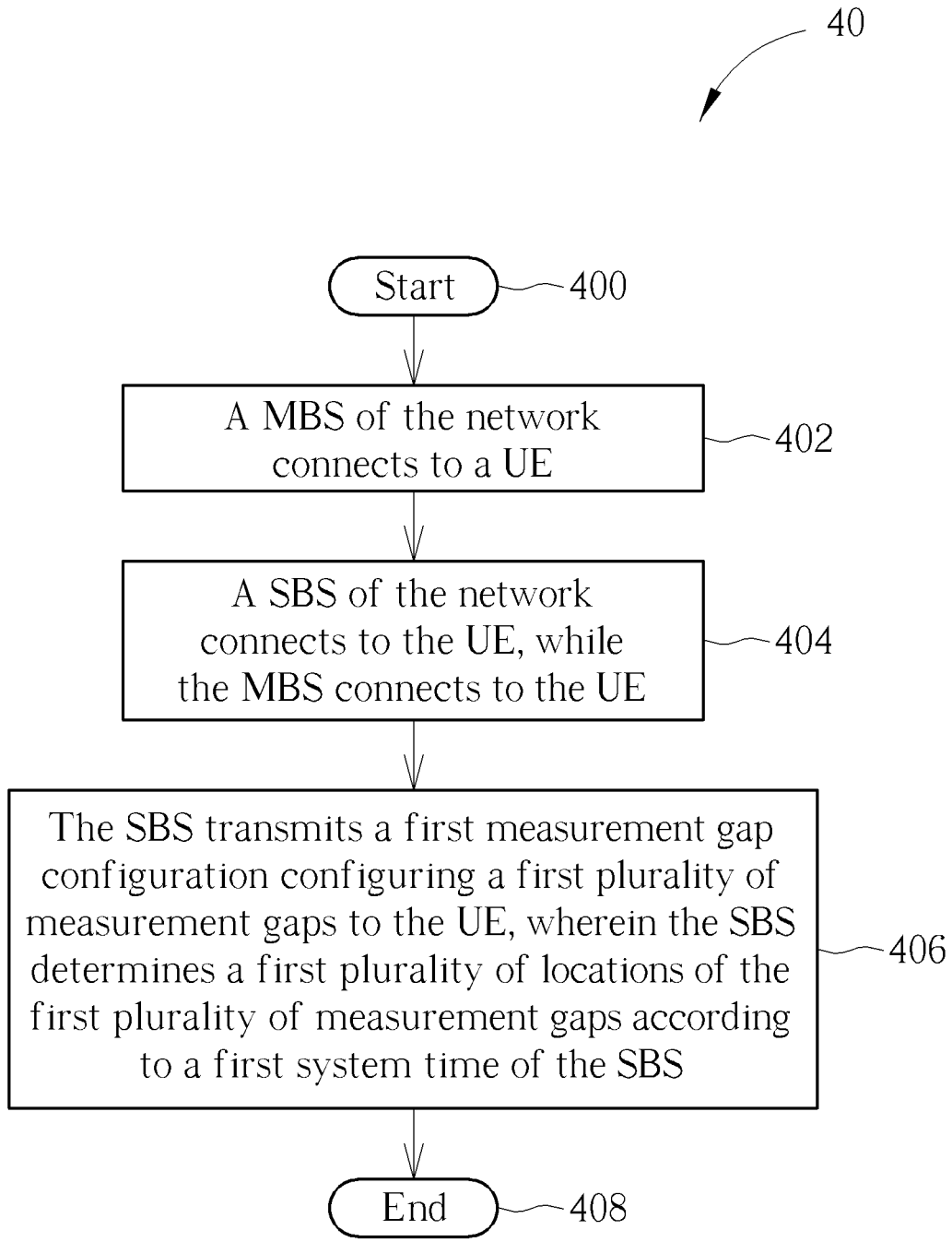
FIG. 4 is a flowchart of a process according to an example of the present invention.

A process 40 in FIG. 4 may be utilized in a network, and includes the following steps:
Step 400: Start.
Step 402: A MBS of the network connects to a UE.
Step 404: A SBS of the network connects to the UE, while the MBS connects to the UE.
Step 406: The SBS transmits a first measurement gap configuration configuring a first plurality of measurement gaps to the UE, wherein the SBS determines a first plurality of locations of the first plurality of measurement gaps according to a first system time of the SBS.
Step 408: End.

The SBS may not schedule transmission (e.g., control information or data) to the UE in (the first plurality of locations of) the first plurality of measurement gaps, because the UE is not able to receive the scheduled transmission from the SBS due to performing at least one first measurement on the first carrier. In one example, the MBS transmits a second measurement gap configuration configuring a second plurality of measurement gaps to the UE, wherein the MBS determines a second plurality of locations of the second plurality of measurement gaps according to a second system time of the MBS. Thus, the MBS may not schedule transmission (e.g., control information or data) to the UE in (the second plurality of locations of) the second plurality of measurement gaps, because the UE is not able to receive the scheduled transmission from the MBS due to performing at least one second measurement on the second carrier.

Figure 5:
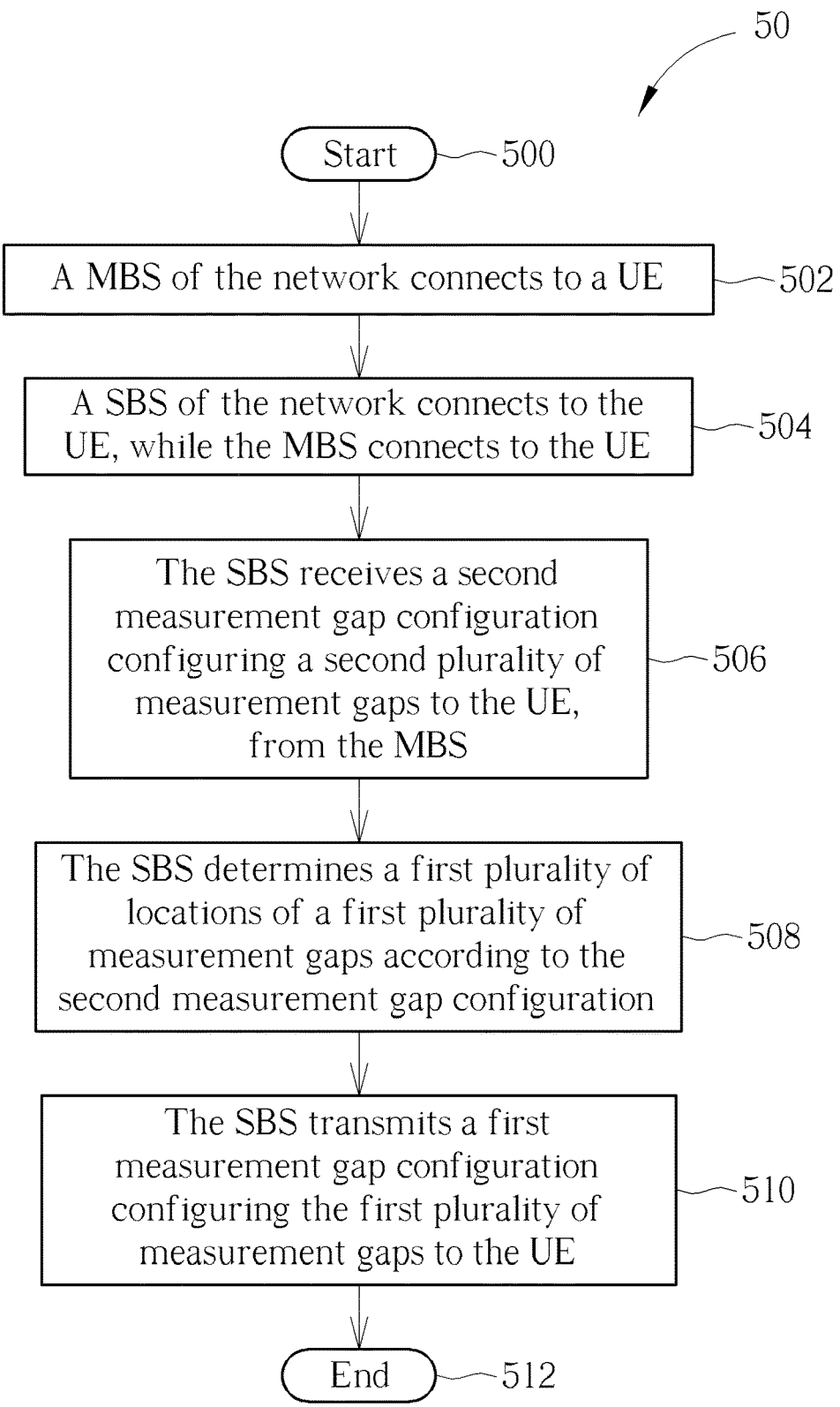
FIG. 5 is a flowchart of a process according to an example of the present invention.

A process 50 in FIG. 5 may be utilized in a network, and includes the following steps:
Step 500: Start.
Step 502: A MBS of the network connects to a UE.
Step 504: A SBS of the network connects to the UE, while the MBS connects to the UE.
Step 506: The SBS receives a second measurement gap configuration configuring a second plurality of measurement gaps to the UE, from the MBS.
Step 508: The SBS determines a first plurality of locations of a first plurality of measurement gaps according to the second measurement gap configuration.
Step 510: The SBS transmits a first measurement gap configuration configuring the first plurality of measurement gaps to the UE.
Step 512: End.

According to the process 50, the SBS may refer to the second measurement gap configuration, when generating the first measurement configuration, i.e., determining the first plurality of locations.

In one example, the SBS determines that the first plurality of locations and the second plurality of locations are the same. In one example, the SBS determines that only part of the first plurality of locations and part of the second plurality of locations are the same.

The process 50 may be combined with the process 40. The SBS may determine the first plurality of locations according to the second measurement gap configuration and a first system time of the SBS. Alternatively, the SBS may determine the first plurality of locations according to the first system time of the SBS without referring to or receiving the second measurement gap configuration. That is, the MBS and the SBS determine the second plurality of measurement gaps and the first plurality of measurement gaps independently.

The SBS may determine the first plurality of locations according to the second measurement gap configuration and a second system time of the MBS. Then, the UE determines the first plurality of locations of the first plurality of measurement gaps according to the second system time acquired from the MBS.

Examples/description for the process 30 above may be modified to a process 60 as following.

Figure 6:
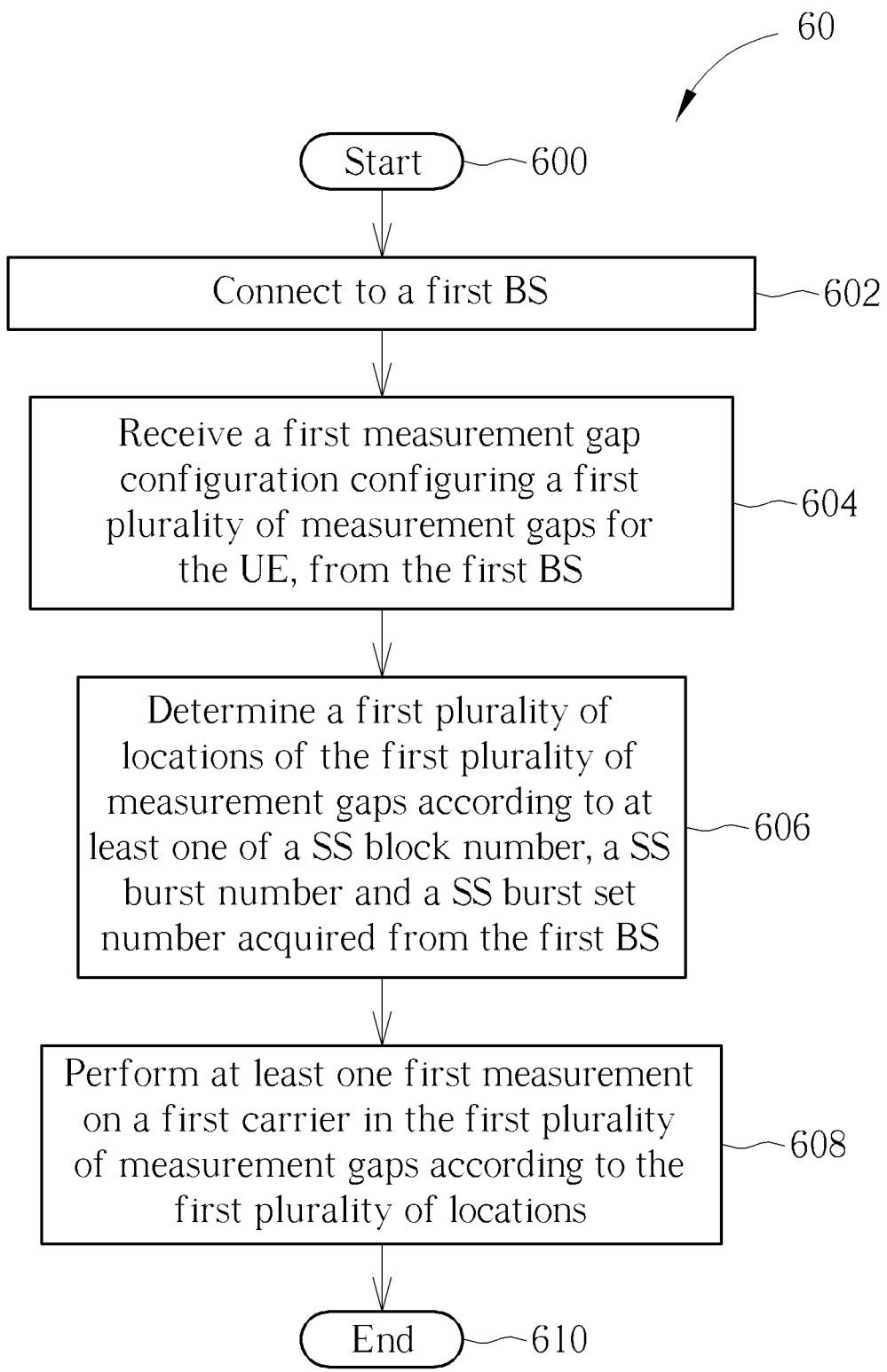
FIG. 6 is a flowchart of a process according to an example of the present invention.

A process 60 in FIG. 6 may be utilized in a UE, and includes the following steps:
Step 600: Start.
Step 602: Connect to a first BS.

Step 604: Receive a first measurement gap configuration configuring a first plurality of measurement gaps for the UE, from the first BS.

Step 606: Determine a first plurality of locations of the first plurality of measurement gaps according to at least one of a SS block number, a SS burst number and a SS burst set number acquired from the first BS.

Step 608: Perform at least one first measurement on a first carrier in the first plurality of measurement gaps according to the first plurality of locations.

Step 610: End.

In one example, the UE receives a second measurement gap configuration configuring a second plurality of measurement gaps for the UE, from a second BS. The UE determines a second plurality of locations of the second plurality of measurement gaps according to at least one of a SFN and a subframe/timeslot number acquired from the second BS. The UE determines (or acquires) the SFN from the PBCH transmitted by the second BS, and determines the subframe/timeslot number from at least on SS transmitted by the second BS. That is, information used for determining the first plurality of locations and information used for determining the second plurality of locations are different. The UE performs at least one second measurement on a second carrier in the second plurality of measurement gaps according to the second plurality of locations. On the other hand, the second BS determines the second plurality of locations according to the at least one of the SFN and the subframe/timeslot number.

The above examples/descriptions may be applied to any of the processes 30-60, and not repeated herein.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and related communication device for handling a measurement gap. Thus, the UE knows how to handle the measurement gap in DC. As a result, the problem of handling the measurement gap in the DC is solved.

What is claimed is:

1. A user equipment of handling a measurement gap, comprising:
   a storage device; and
   a processing circuit, coupled to the storage device, wherein the storage device stores, and the processing circuit is configured to execute instructions of:
   connecting to a master base station (MBS);
   connecting to a secondary base station (SBS), while connecting to the MBS;
   receiving a first measurement gap configuration configuring a first plurality of measurement gaps for the user equipment, from the SBS via a radio resource control (RRC) connection with the MBS;
   acquiring a first system time from the SBS by receiving at least one synchronization signal (SS) and a physical broadcast channel (PBCH) from the SBS;
   determining a first plurality of locations of the first plurality of measurement gaps according to the first system time acquired from the SBS; and
   performing at least one first measurement on a first carrier in the first plurality of measurement gaps according to the first plurality of locations.

2. The user equipment of claim 1, wherein the instructions further comprise:
   transmitting a first measurement result of the first carrier to the SBS in response to the at least one first measurement.

3. The user equipment of claim 1, wherein the instruction of connecting to the MBS comprises:
   establishing a radio resource control (RRC) connection with the MBS.

4. The user equipment of claim 1, wherein the instruction of connecting to the SBS comprises:
   establishing a master cell group (MCG) bearer, a secondary cell group (SCG) bearer or a SCG split bearer with the SBS.

5. The user equipment of claim 1, wherein the instructions further comprise:
   receiving the first measurement gap configuration from the SBS via a signaling radio bearer (SRB), while connecting to the MBS.

6. The user equipment of claim 1, wherein the instructions further comprises:
   receiving a second measurement gap configuration configuring a second plurality of measurement gaps for the user equipment, from the MBS;
   determining a second plurality of locations of the second plurality of measurement gaps according to a second system time acquired from the MBS;
   performing at least one second measurement on a second carrier in the second plurality of measurement gaps according to the second plurality of locations; and
   transmitting a second measurement result of the second carrier to the MBS in response to the at least one second measurement.

7. The user equipment of claim 1, wherein the first system time comprises a system frame number (SFN), a subframe number, a timeslot number, a SS block number, or combination thereof.

8. A network of handling a measurement gap, configured to execute instructions of:
   a master base station (MBS) of the network connecting to a user equipment;
   a secondary base station (SBS) of the network connecting to the user equipment, while the MB S connecting to the user equipment;
   the SBS transmitting at least one synchronization signal (SS) and a physical broadcast channel (PBCH) for a user equipment to acquire a first system time; and
   the SBS transmitting to the user equipment a first measurement gap configuration via a radio resource control (RRC) connection with the MBS for the user equipment to determine a first plurality of locations of a first plurality of measurement gaps according to the first system time.

9. The network of claim 8, wherein the instructions further comprise:
   the MBS transmitting a second measurement gap configuration configuring a second plurality of measurement gaps to the user equipment, wherein the MBS determines a second plurality of locations of the second plurality of measurement gaps according to a second system time of the MBS.

10. The network of claim 8, wherein the instructions further comprise:
the SBS determines the first plurality of locations of the first plurality of measurement gaps according to a second system time of the SBS.

11. A network of handling a measurement gap, configured to execute instructions of:
a master base station (MBS) of the network connecting to a user equipment;
a secondary base station (SBS) of the network connecting to the user equipment, while the MBS connecting to the user equipment;
the SBS receiving a second measurement gap configuration configuring a second plurality of measurement gaps to the user equipment, from the MBS;
the SBS determining a first plurality of locations of a first plurality of measurement gaps according to the second measurement gap configuration; and
the SBS transmitting a first measurement gap configuration configuring the first plurality of measurement gaps to the user equipment via a radio resource control (RRC) connection with the MBS, wherein the first measurement gap configuration configures a first measurement gap repetition period (MGRP) and the second measurement gap configuration configures a second MGRP.

12. The network of claim 11, wherein the SBS determines the first plurality of locations according to the second measurement gap configuration and a first system time of the SBS.

13. The network of claim 11, wherein the SBS determines the first plurality of locations according to the second measurement gap configuration and a second system time of the MBS.

* * * * *